(12) United States Patent
Bertocchi et al.

(10) Patent No.: US 9,738,484 B2
(45) Date of Patent: Aug. 22, 2017

(54) YARN FEEDER WITH ROTARY STORAGE DRUM AND YARN-UNWINDING SENSOR

(71) Applicant: L.G.L. ELECTRONICS S.P.A., Gandino (IT)

(72) Inventors: Giorgio Bertocchi, Leffe (IT); Mauro Varischetti, Gandino (IT); Pietro Zenoni, Leffe (IT)

(73) Assignee: L.G.L. ELECTRONICS S.P.A., Gandino (IT)

( * ) Notice: Subject to any disclaimer, the term of this patent is extended or adjusted under 35 U.S.C. 154(b) by 101 days.

(21) Appl. No.: 14/847,939

(22) Filed: Sep. 8, 2015

(65) Prior Publication Data
US 2016/0068365 A1 Mar. 10, 2016

(30) Foreign Application Priority Data
Sep. 5, 2014 (IT) .............................. TO2014A0699

(51) Int. Cl.
*B65H 51/22* (2006.01)
*G01D 5/34* (2006.01)
*D04B 15/48* (2006.01)
*D03D 47/36* (2006.01)
*B65H 63/00* (2006.01)

(52) U.S. Cl.
CPC ........... *B65H 51/22* (2013.01); *B65H 63/003* (2013.01); *D03D 47/367* (2013.01); *D04B 15/48* (2013.01); *D04B 15/486* (2013.01); *G01D 5/342* (2013.01); *B65H 2701/31* (2013.01)

(58) Field of Classification Search
CPC ..... B65H 51/22; D04B 15/486; D03D 47/367
See application file for complete search history.

(56) References Cited

U.S. PATENT DOCUMENTS 4,653,701 A 3/1987 Riva

FOREIGN PATENT DOCUMENTS

| DE | 3904807 A1 | 9/1989 | |
|---|---|---|---|
| EP | 2592032 A1 | 5/2013 | |
| GB | 2277533 A | 11/1994 | |
| IT | EP 2907907 A1 * | 8/2015 | ........... D04B 15/482 |
| WO | 0048934 A1 | 8/2000 | |

* cited by examiner

*Primary Examiner* — William E Dondero
(74) *Attorney, Agent, or Firm* — Cantor Colburn LLP

(57) ABSTRACT

A motorized rotary drum supported on a motor housing bears a plurality of yarn loops wound thereon, such loops being adapted to be unwound upon request from a downstream machine. A yarn-unwinding sensor comprises light-emitting elements and light-receiving elements both of which are integral with the motor housing. Light-guiding elements which are integral with the drum guide the light from the light-emitting elements to a window which is defined on the rotary drum in a position such that it is repeatedly engaged by the yarn during its rotary unwinding motion, and vice versa. A reflecting surface reflects the light coming out of the window back towards the window. Light-deviating elements which are integral with the motor housing deviate the light coming back from the window towards the light-receiving elements. The unwinding of a yarn loop from the drum is determined on the basis of the variation of light resulting from the yarn transiting on the window.

9 Claims, 4 Drawing Sheets

YARN FEEDER WITH ROTARY STORAGE DRUM AND YARN-UNWINDING SENSOR

CROSS REFERENCE TO RELATED APPLICATION

This application is related to and claims the benefit of Italian Patent Application Number TO2014000699 filed on 5 Sep. 2014, the entire contents of which are hereby incorporated by reference in their entirety.

TECHNICAL FIELD

The present invention relates to a yarn feeder with rotary storage drum and yarn-unwinding sensor.

BACKGROUND

As is known, in weaving processes the yarn can be fed to a textile machine, e.g. a circular knitting machine, from a plurality of yarn feeders which are provided with a storage drum which bears a plurality of yarn loops wound around it which are adapted to be unwound upon request from the downstream machine. As the yarn is unwound from the drum, it can be reloaded either by a motorized arm which rotates like a swivel about an axis that is coaxial to the axis of the drum, or, in the case of the feeders to which reference is made here, by rotating the drum which, therefore, in this case, is motorized.

As is well known to the person skilled in the art, it is extremely important to maintain the reserve of yarn on the drum substantially constant at an optimal value, in order to stabilize the tension of the yarn in output from the yarn feeder. In fact, reducing the reserve below the optimal quantity would cause an excessive increase in the tension of the yarn in output, with the result that defects will be generated in the finished garment. By contrast, an increase in the reserve beyond the optimal quantity can lead to an accumulation of yarn on the end part of the drum, with uneven superimposition of the loops and consequent irregularities in the feeding process.

In EP 2 592 032, the rotation of the motor is controlled so as to maintain the quantity of yarn substantially constant with respect to a preset reserve quantity which is wound on the drum during an initial loading procedure. The yarn feeder is provided with a sensor which is arranged at the output end of the drum and is provided with three or more photocells which are fixed angularly equidistant about the axis of the drum in order to detect the passage of the yarn. On the basis of the sequence with which the photocells are activated, the control unit determines whether the yarn is unwound or wound and controls the motor so that, during normal operation, the quantity of yarn wound is equal to the quantity of yarn unwound, in which case the sensor will not detect the passage of any turn of yarn. Therefore, under operating conditions, an external observer will see the yarn substantially stationary (in the direction of rotation), since the speed for winding in one direction will be the same as the speed of unwinding in the opposite direction.

As a consequence, in the system disclosed in EP 2 592 032, the sensor on its own is not capable of providing absolute information on the quantity of yarn which is unwound from the drum, but only information that corresponds to the quantity of yarn which is wound.

BRIEF SUMMARY

The principal aim of the present invention is to provide a storage yarn feeder with rotary drum, which is provided with a yarn-unwinding sensor which is capable on its own of providing absolute, precise and reliable information on the quantity of yarn which is unwound from the drum, under any conditions of operation or transition.

BRIEF DESCRIPTION OF THE INVENTION

Now the invention will be described in more detail, with reference to some preferred, but not exclusive, embodiments thereof, which are illustrated for the purposes of non-limiting example in the accompanying drawings, wherein.

DETAILED DESCRIPTION

With reference to the figures, a storage yarn feeder 10 comprises a yarn-winding drum 12 which bears a plurality of yarn loops Y thereon which form a reserve S and are adapted to be unwound on request from a generic downstream machine (not shown). While the yarn is unwound from the drum 12, the latter is made to rotate by a motor 14 in order to retrieve new yarn from a distaff (not shown) and wind it on itself in the form of new loops.

Figure 1:
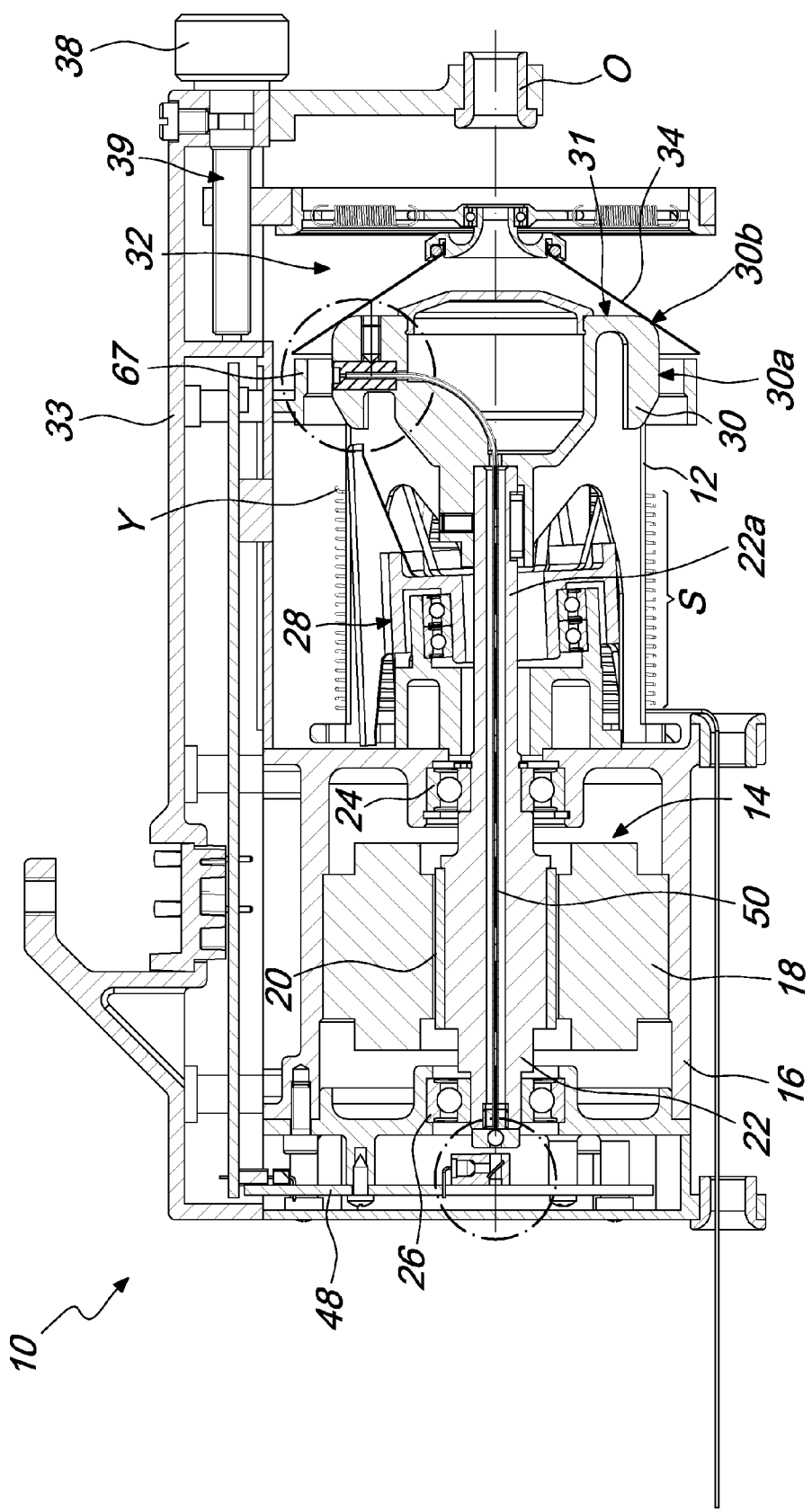
FIG. 1 is an axial cross-sectional view of a yarn feeder with rotary storage drum, which is provided with a yarn-unwinding sensor, in a first embodiment of the invention.

As illustrated in FIG. 1, the motor 14 is accommodated in a motor housing 16 of the feeder 10, and comprises an annular stator 18 which is fixed in the motor housing 16, and a rotor 20 which is inserted in the annular stator 18, which is fitted on a hollow driving shaft 22. The hollow driving shaft 22 is supported in the motor housing 16 by a pair of bearings 24, 26, and extends outside the motor housing 16 with an extension 22a on which the drum 12 is keyed.

The drum 12 incorporates a device which acts as a separator of loops 28 and is adapted to keep the loops wound on the drum 12 longitudinally mutually separated. The device which acts as a separator of loops 28 is known per se and therefore it will not be described.

The output end of the drum 12 is closed by a cover 30. The outer surface of the cover 30 has an annular surface, in particular, a cylindrical surface 30a which is engaged by the unwinding yarn and is connected to the front surface 31 of the cover 30 by a rounded output edge 30b.

The feeder 10 is also provided with a braking device 32, known per se, which is supported by an arm 33 that juts out from the motor housing 16 parallel to the axis of the drum 12.

The braking device 32 comprises a hollow, truncated cone-shaped braking body 34 which is pushed by elastic means 36 to come coaxially into abutment, with its inner surface, against the rounded output edge 30b of the cover 30, in order to exert a static braking action by friction on the unwinding yarn. The braking action is manually adjustable by way of a knob 38 which commands adjustment means 39 which are incorporated in the arm 33, and which are also known per se and therefore not described in detail.

The yarn Y in output from the feeder is guided by a thread-guide eyelet O, which is also supported by the arm 33.

A control unit (not shown) is programmed to drive the motor 14 so as to stabilize the reserve present on the drum 12 at a preset optimal level. In particular, the reserve of yarn is determined on the basis of the number of loops that are unwound from the drum 12 and the number of loops that are wound.

The number of loops that can be wound on the drum 12 can be calculated on the basis of the rotation speed or of the position of the motor 14, in a way that is known per se.

In order to detect the loops wound, the yarn feeder 10 is provided with a sensor 40 which, according to the invention, comprises:

light-emitting means 42 (FIG. 2) which are integral with the motor housing 16, light-receiving means 45 (FIG. 2) which are also integral with the motor housing 16, light-guiding means 50 which are integral with the drum 12 and are arranged to guide the light from the light-emitting means 42 to a window 30c (FIG. 3) which is defined on the cylindrical surface 30a in a position such that it is repeatedly engaged by the yarn during its rotary unwinding motion, and vice versa, a reflecting surface 43 (FIG. 3) which is adapted to reflect the light coming out of the window 30c back towards the window 30c, light-deviating means 44 (FIG. 2) which are integral with the motor housing 16, and arranged to deviate the light coming back from the window 30c towards the light-receiving means 45;

so that the unwinding of a yarn loop from the drum 12 is determined on the basis of the variation of light resulting from the yarn transiting on the window 30c.

The light-emitting means advantageously comprise a diode emitter 42 of infrared light which is functionally connected to a card 48 of the control unit incorporated in the motor housing 16. The diode emitter 42 is embedded in a support 49 mounted on the card 48, and is arranged so as to emit a linear beam of infrared light in an axial direction toward the rear end of the hollow driving shaft 22 (i.e., the end opposite to the extension 22a), by way of a first passage 49a which is defined on the support 49.

The light-receiving means advantageously comprise a diode receiver 45 of infrared light which is also inserted in the support 49 with its axis perpendicular to, and incident on, the axis of the diode emitter 42. The diode receiver 45 is also functionally connected to the card 48 and can receive light through a second passage 49b defined in the support 49, which is perpendicular to, and intersects, the first passage 49a.

The light-deviating means comprise a semi-reflecting mirror 44 mounted in the support 49 in the region of intersection between the first passage 49a and the second passage 49b, and is slanted by 45° with respect to the rotation axis of the drum in order to allow the light emitted by the diode emitter 42 to pass through and reflect radially toward the diode receiver 45 at least a part of the light coming back in the same axial direction but in the opposite direction. In a way that is known per se, the semi-reflecting mirror can comprise a glass plate or other transparent material, having one side covered by a layer of material which is only partially reflective, e.g., a dichroic coating.

Figure 2:
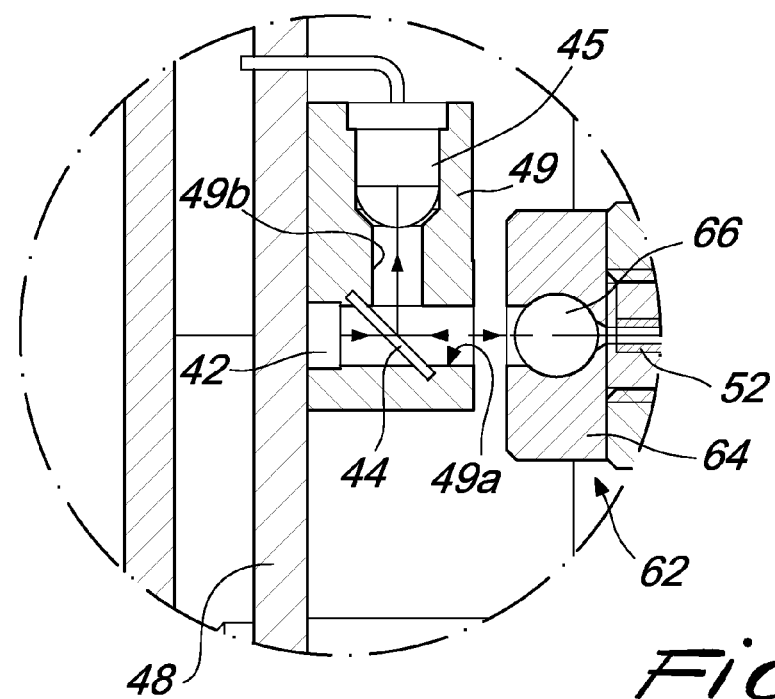
FIG. 2 is an enlarged view of a first detail of FIG. 1.
Figure 3:
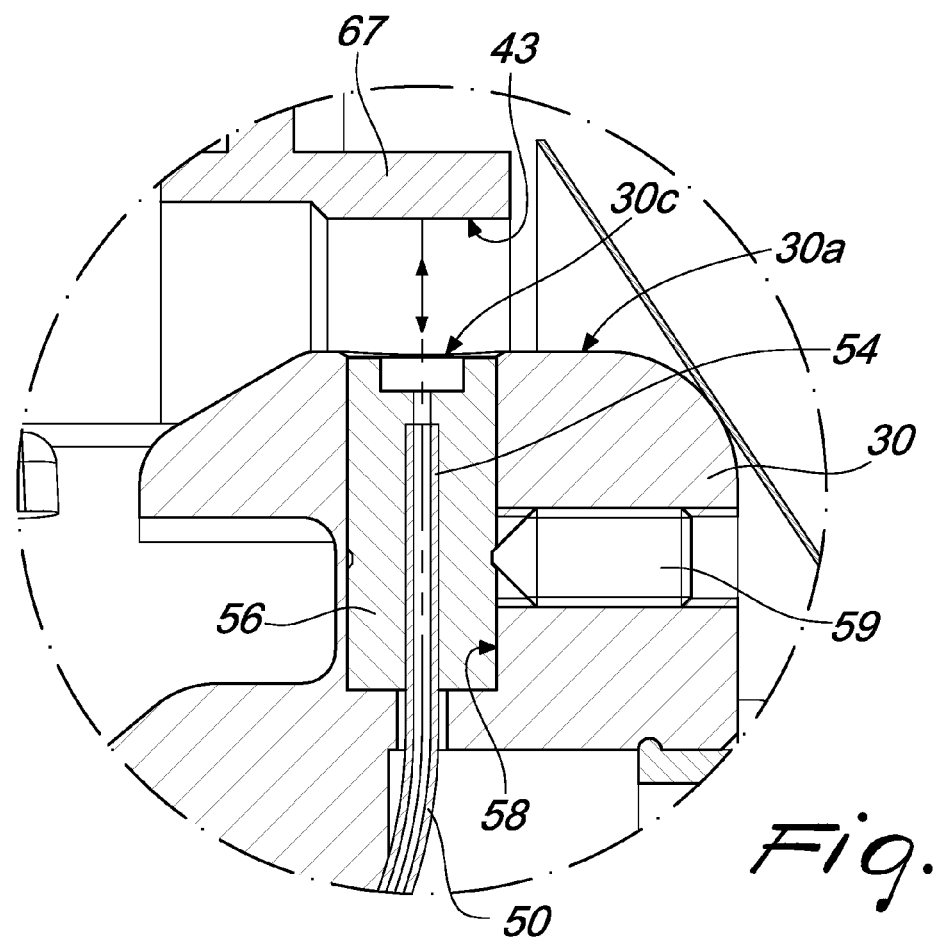
FIG. 3 is an enlarged view of a second detail of FIG. 1.

In this embodiment of the invention, the light-guiding means comprise an optical fiber cable 50 which is inserted in the hollow driving shaft 22 and in its extension 22a. A first end 52 of the optical fiber cable 50 is fixed at the rear end of the hollow driving shaft 22 and coaxially faces the diode emitter 42 (FIG. 2). The opposite end 54 of the optical fiber cable 50 is inserted in a sleeve 56 which is accommodated in a radial through channel 57 which is defined in the cover 30 and leads onto the cylindrical surface 30a at the window 30c. The sleeve 56 is closed at its outer end by a disk 58 made of transparent material, e.g., glass, situated at the level of the cylindrical surface 30a, and is retained in position by a screw 59 which is screwed in the cover 30.

The rear end of the hollow driving shaft 22 bears, fixed, an optical device 62 which is adapted to convey the light originating from the diode emitter 42 toward the first end 52 of the optical fiber cable 50. The optical device 62 comprises an axially perforated ring 64, which is screwed at the rear end of the hollow driving shaft 22 and bears, inserted, the first end 52 of the optical fiber cable 50. The ring 64 accommodates a spherical lens 66 which is arranged to focus the light generated by the diode emitter 42 onto the first end 52 of the optical fiber cable 50.

In this embodiment, the reflecting surface 43 is defined within a retroreflector ring 67 which is also supported by the arm 33. The retroreflector ring 67 coaxially surrounds the drum 12 and faces the annular surface 30a of the cover 30 in a position aligned with the window 30c.

In operation, as illustrated in FIG. 1, whenever a yarn loop is unwound from the drum 12, the yarn transits over the window 32c, blocking the beam of infrared light generated by the diode emitter 42, which therefore is not reflected by the retroreflector ring 67 and does not reach the diode receiver 45. The control unit detects the interruption of light and as a consequence counts the unwinding of one yarn loop.

It can easily be understood that the sensor according to the invention, independently of the rotation speed of the drum, makes it possible to count the number of loops unwound in absolute terms instead of in terms corresponding to the number of loops wound, as occurs in the prior art mentioned at the start of the present description.

Figure 4:
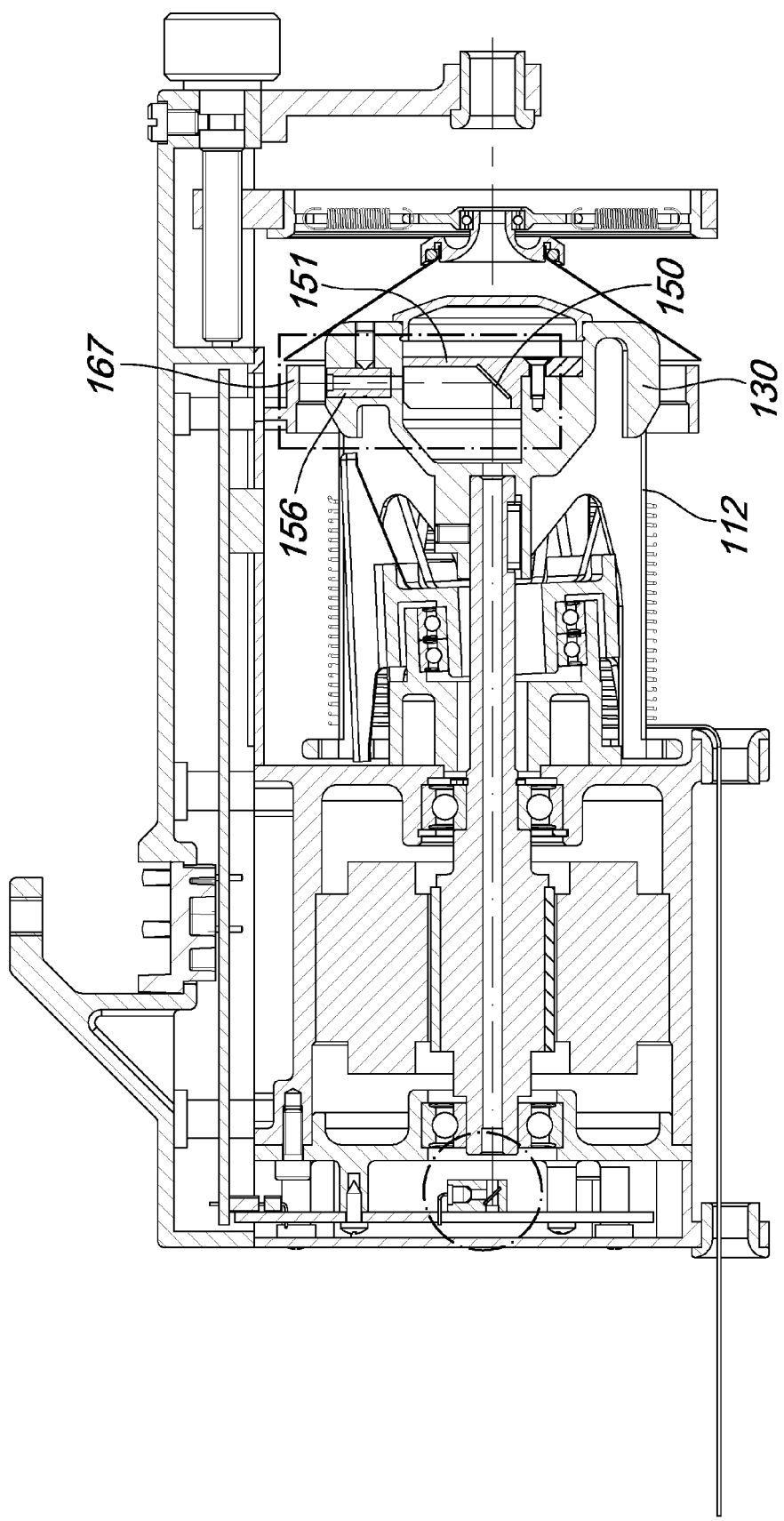
FIG. 4 is an axial cross-sectional view of a yarn feeder with rotary storage drum, which is provided with a yarn-unwinding sensor, in a second embodiment of the invention.
Figure 5:
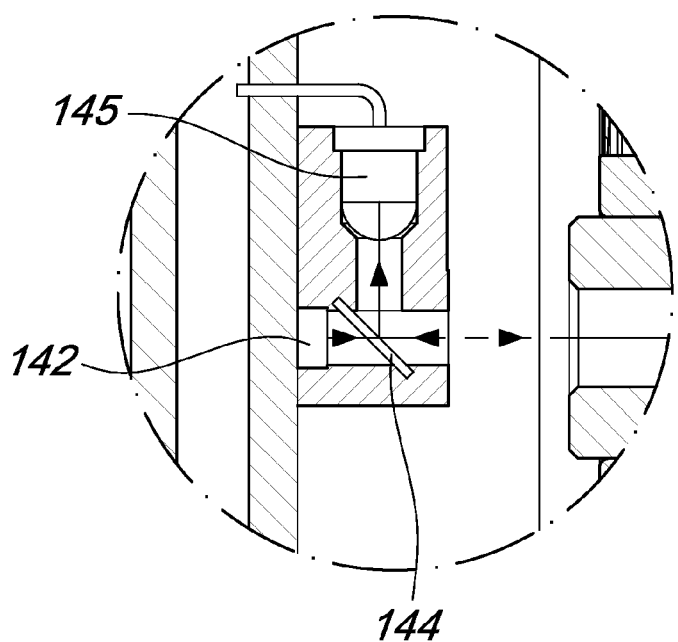
FIG. 5 is an enlarged view of a first detail of FIG. 4.
Figure 6:
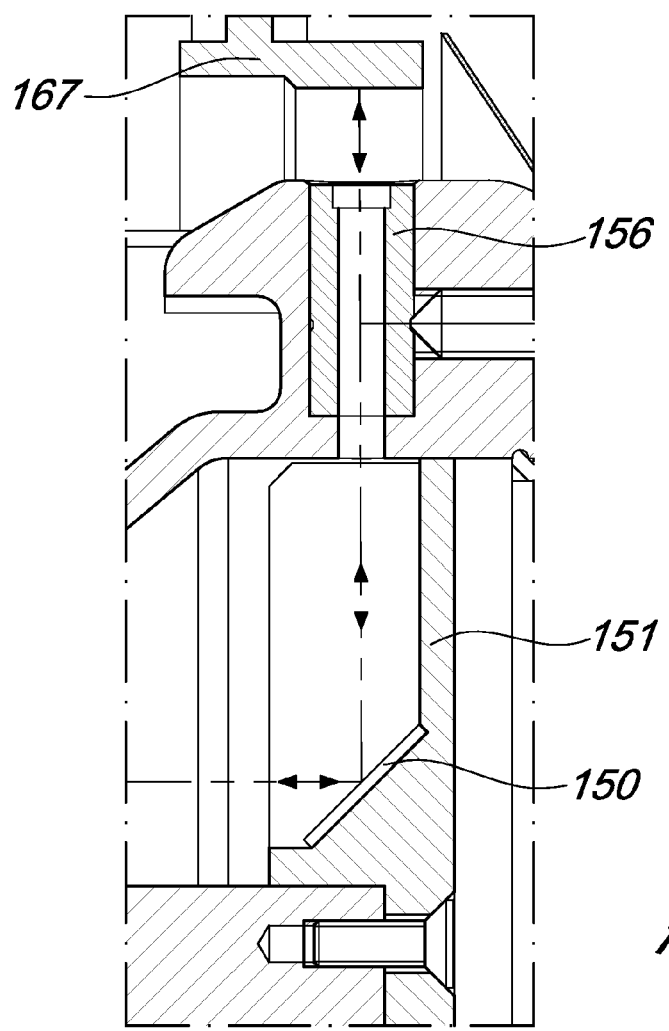
FIG. 6 is an enlarged view of a second detail of FIG. 4.

FIG. 4 shows an alternative embodiment of the invention, which differs from the previous embodiment substantially in that the light-guiding means, which in the previous embodiment were constituted by the optical fiber cable 50, are substituted by a mirror 150 which is supported in the cover 130, by way of a support 151. The mirror 150 is slanted by 45° with respect to the axis of the drum 112, so as to reflect by 90° the beam of infrared light generated by the diode emitter 142 toward the retroreflector ring 167 through the sleeve 156, and vice versa. As in the previous case, the returning beam is deviated toward the diode receiver 145 by the semi-transparent mirror 144.

In the embodiments described above, the light path from the diode emitter 42 to the diode receiver 45 is closed if there are no loops, while the transit of a turn causes the opening thereof. However, the unwinding of loops can also be determined by using the yarn itself as a means of reflection of light. In such case, the light path is open if there are no loops, while, upon the transit of a turn, it is closed by way of the reflection of the beam on the yarn. In such case, obviously, the retroreflector ring is no longer necessary.

Some preferred embodiments of the invention have been described, but obviously the person skilled in the art may make various modifications and variations within the scope of the description. For example, the light passage can be arranged in an intermediate longitudinal position of the drum in order to use the sensor only as a reserve sensor adapted to provide a binary item of information on the presence/absence of reserve in a preset region of the drum. Alternatively, the light passage can also be arranged on the rounded output edge of the drum or on the front surface of the latter (especially if the braking device 32 is absent), so as to intercept the yarn downstream of the rounded output edge. Furthermore, the semi-reflecting mirror can be substituted by a combination of contoured prisms. Also, the diode emitter can be substituted by a different light source, e.g., a laser emitter operating on infrared light or on another wavelength. The retroreflector ring can also be substituted by another reflective annular surface, e.g., a mirror. Obviously, the slant of 45° both of the semi-reflecting mirror 44, 144 and of the mirror 150 in the second embodiment has been chosen for reasons of simplicity of construction, but obviously similar results can be obtained with any other inclination.

What is claimed is:

1. A storage yarn feeder, comprising:
   a motorized rotary drum supported on a motor housing and adapted to bear a plurality of yarn loops wound thereon, such loops being adapted to be unwound upon request from a downstream machine, and
   a yarn-unwinding sensor which is adapted to count the yarn loops unwinding from the motorized rotary drum,
   wherein said yarn-unwinding sensor comprises:
   light-emitting means which are integral with the motor housing,
   light-receiving means which are integral with the motor housing,
   light-guiding means which are integral with the drum, and are arranged to guide the light from said light-emitting means to a window which is defined on the rotary drum in a position such that it is repeatedly engaged by the yarn during its rotary unwinding motion, and vice versa,
   a reflecting surface which is adapted to reflect the light coming out of said window back towards said window, and
   light-deviating means which are integral with the motor housing and arranged to deviate the light coming back from said window towards said light-receiving means,
   whereby the unwinding of a yarn loop from the drum is determined on the basis of the variation of light resulting from the yarn transiting on said window.

2. The storage yarn feeder according to claim 1, wherein said drum is supported on a hollow driving shaft and said light-emitting means are arranged to emit an infrared light beam in an axial direction towards one end of said hollow driving shaft.

3. The storage yarn feeder according to claim 2, wherein said light-deviating means comprise a semi-reflecting mirror which is arranged obliquely to the axis of rotation of the drum in order to allow the light emitted by said light-emitting means to pass through, and reflect at least a part of the light coming back from said window towards said light-receiving means.

4. The storage yarn feeder according to claim 2, wherein said light-guiding means comprise an optical fiber cable which is inserted in said hollow driving shaft and has a first end which coaxially faces said light-emitting means, and a second end which faces said window.

5. The storage yarn feeder according to claim 4, wherein it comprises an optical device which is adapted to direct the light coming from said light-emitting means towards said first end of the optical fiber cable.

6. The storage yarn feeder according to claim 5, wherein said optical device comprises a spherical lens supported at the rear end of said hollow driving shaft in order to focus the light generated by said light-emitting means onto said first end of the optical fiber cable.

7. The storage yarn feeder according to claim 2, wherein said light-guiding means comprise a mirror slanted so as to reflect light from said light-emitting means towards said window, and vice versa.

8. The storage yarn feeder according to claim 1, wherein said reflecting surface is internally provided on an annular member which coaxially surrounds the drum at a position aligned with said window.

9. The storage yarn feeder according to claim 1, wherein said reflecting surface is the surface of the yarn when it engages said window.

* * * * *